(12) United States Patent
Chugh

(10) Patent No.: US 8,407,084 B2
(45) Date of Patent: Mar. 26, 2013

(54) USER SELECTABLE GAME INFORMATION ASSOCIATED WITH AN ASSET

(75) Inventor: Yogesh Chugh, Fremont, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 1290 days.

(21) Appl. No.: 12/139,025

(22) Filed: Jun. 13, 2008

(65) Prior Publication Data

US 2009/0313084 A1    Dec. 17, 2009

(51) Int. Cl.
*G06Q 40/00* (2012.01)
(52) U.S. Cl. .................. 705/14.1; 705/14.13; 705/14.14; 705/14.64; 705/14.12
(58) Field of Classification Search .................... 705/14, 705/14.1, 14.12, 14.13, 14.14, 14.64
See application file for complete search history.

(56) References Cited

U.S. PATENT DOCUMENTS

| | | | |
|---|---|---|---|
| 6,966,831 B2 | 11/2005 | Miyaki et al. | |
| 8,069,169 B2 * | 11/2011 | Fitzpatrick et al. | 707/732 |
| 2002/0152462 A1 * | 10/2002 | Hoch et al. | 725/37 |
| 2008/0201078 A1 * | 8/2008 | Fitzpatrick et al. | 701/302 |
| 2008/0201283 A1 * | 8/2008 | Fitzpatrick et al. | 706/21 |
| 2008/0201305 A1 * | 8/2008 | Fitzpatrick et al. | 707/3 |
| 2008/0201310 A1 * | 8/2008 | Fitzpatrick et al. | 707/4 |
| 2008/0201321 A1 * | 8/2008 | Fitzpatrick et al. | 707/5 |
| 2011/0208736 A1 * | 8/2011 | Fitzpatrick et al. | 707/736 |
| 2011/0246070 A1 * | 10/2011 | Fitzpatrick et al. | 701/300 |
| 2011/0258156 A1 * | 10/2011 | Fitzpatrick et al. | 706/50 |

* cited by examiner

*Primary Examiner* — Jagdish Patel
*Assistant Examiner* — Kevin Poe
(74) *Attorney, Agent, or Firm* — Kilpatrick Townsend & Stockton LLP

(57) ABSTRACT

Systems, apparatus and methods for interacting with a virtual world being displayed on a video display are described. The virtual world includes user selectable tagged images. The tagged images are related to an asset and can include a redemption feature that can be used when acquiring the asset. A user interacting with a game console can select the tagged images. Upon selection of the tagged image the game console can communicate information related to the tagged image, the related asset and/or the redemption feature to a mobile device. The tagged images can also be associated with distribution rules that can be evaluated to determine when and to whom to distribute digital coupons associated with the tagged images.

21 Claims, 7 Drawing Sheets

USER SELECTABLE GAME INFORMATION ASSOCIATED WITH AN ASSET

BACKGROUND OF THE INVENTION

1. Field of the Invention

The invention relates to the field of video games, and specifically to methods and systems for displaying selectable advertisements or coupons linked to an asset within the video game. Further, the invention relates to methods and systems for detecting a mobile device and wirelessly communicating information related to the coupon and/or asset to the wireless device.

2. Background of the Invention

The continual advancement of computer processing power is evident in the field of computer based gaming. Processor intensive video games were once available only in standalone dedicated units manufactured for use in arcades. As computer processing capabilities advanced, the price of powerful processors and associated electronics such as memory, interface chips, and displays, decreased to a level that allowed processor based games to be produced for the consumer market.

Video game systems include a console system or core unit that includes a processor, memory (e.g., Random Access Memory), and audio visual subsystems such as a co-processor. The console system serves as a hub between the video display or monitor, various controllers (e.g., joy sticks and other user interface devices), and external memory devices containing the game software.

Originally, games were contained in external memory such as tapes, compact discs, DVD's, memory cards, etc. More recently, with the advent of the Internet, games can be downloaded over the Internet to the console system from external sources. Thus, the console system is interconnected to the Internet which is a source for a huge amount of ever changing content.

Another change in recent years is the emergence of multitudes of mobile and/or wireless devices including lap top computers, cell phones, smart phones, Personal Digital Assistants (PDAs), and other mobile devices. Individuals are utilizing mobile devices for more and more of their every day tasks including shopping, calendars, scheduling meetings, receiving emails, etc.

Electronic commerce, or E-commerce, is becoming a larger and more important part of the economy as the Internet and mobile and wireless networks become more and more ubiquitous. Digital advertising is a very important part of E-commerce. One of the important variables in determining whether an E-commerce business succeeds is the amount of time that potential customers spend observing the digital advertising associated with the business. The longer a person sees an advertisement, the higher the probability that the advertisement will result in the person buying the asset that the advertisement is associated with.

Many people spend hours each day involved with console systems such as video games. Video games were originally static items in which all of the video and audio content was loaded into non-volatile memory that was then loaded into the game console. However, with the advent of the internet and with the increase in processing power of console systems, game content can be updated easily by downloading it from the Internet.

The time spent by people interacting with console systems has not been exploited in terms of electronic commerce. In addition, console systems have not typically exploited the proliferation of mobile devices through interaction with these devices.

BRIEF SUMMARY OF THE INVENTION

A system, apparatus and method for providing virtual coupons or other advertising in a video game or other virtual world are disclosed. A console system displays a virtual world and receives inputs from one or more users interacting with the virtual world. The virtual world includes portions that are user selectable coupons or advertisements, also referred to herein as tagged images or virtual coupons, that are associated (tagged) with an asset. For example, a tagged image displayed in the virtual world can depict a product. A user can obtain information about the asset by using a control device such as a joystick or mouse to select the tagged image.

Upon selection of the tagged image by the user, the console system can store information that is representative of the selected tagged image and/or the related asset. The information can be details of a discount offer on the asset. The information could be a serial number that can be used to later identify the redemption deal offered by the tagged image.

The console system can utilize a wireless interface to detect a mobile device. Upon detecting the wireless device, and establishing a communication link, the console system can communicate the stored information to the wireless device. The wireless device could be a laptop computer, a PDA, a cell phone or other mobile device belonging to the user that selected the tagged image.

With the tagged image information stored in the wireless device, the user can present the coupon (either electronically or physically) to a commercial business and/or website. By presenting the tagged image information, the discount or other deal associated with the asset can be afforded the user. Presenting the tagged image information could include uploading the information over an internet connection (wired or wireless) to a website.

The tagged image displayed in the virtual world can be downloaded over a network connection (e.g., an Internet connection) from ah advertising server system. The advertiser server system could target the advertisements to the end user using many known targeting techniques. The downloaded advertisements can be inserted into the virtual world at preselected insertion points designed into the virtual world program.

In one aspect, the disclosure includes a method of providing a virtual coupon associated with an asset. The method of this aspect includes displaying a virtual world on a video display, displaying a tagged image within the video display of the virtual world, the tagged image being associated with an asset, receiving an input from a input device indicating selection of the tagged image by a user interacting with the virtual world, storing in memory one or more of a record of the selected tagged image and a record of the asset associated with the tagged image, detecting a mobile device, and upon detecting the mobile device, wirelessly communicating information to the mobile device, the communicated information related to one or more of the tagged image and the asset with which the tagged image is associated.

In another aspect, the disclosure includes a system for providing a virtual coupon associated with an asset. The system of this aspect includes a video subsystem configured to display a virtual world on a video display, and to display a tagged image within the video display of the virtual world, the tagged image being associated with an asset, an input interface configured to receive an input from an input device indicating selection of the tagged image by a user interacting with the virtual world, a processor configured to store in memory one or more of a record of the selected tagged image and a record of the asset associated with the tagged image, and a wireless interface configured to detect a mobile device using a wireless discovery protocol, and, upon detecting the mobile device, to wirelessly communicate information to the mobile device, the communicated information related to one or more of the tagged image and the asset with which the tagged image is associated.

In another aspect, the disclosure includes a method of controlling a virtual world video sequence, the method enabling insertion of user selectable images into the virtual world video sequence. The method of this aspect includes generating video data configured to display the virtual world video sequence, receiving tag data associated with a selectable image in the video sequence, the tag data being associated with an asset, outputting the video data, including the selectable image, receiving an indicator that the selectable image has been selected by a user, and outputting the tag data upon receiving the indicator. The method of this aspect can further include providing an insertion point in the virtual world video data to insert the selectable image, receiving image data representing the selectable image, and inserting the image data at the insertion point.

In another aspect, the disclosure includes a computer readable medium encoded with computer executable instructions for performing a method of controlling a virtual world video sequence, the instructions enabling insertion of user selectable images into the virtual world video sequence. The method of this aspect includes providing video data configured to display a virtual world video sequence, receiving tag data associated with a selectable image in the video sequence, the tag data being associated with an asset, outputting the video data, including the selectable image, receiving an indicator that the selectable image has been selected by a user, and outputting the tag data upon receiving the indicator. The computer readable medium of this aspect can further include instructions for providing an insertion point in the virtual world video data to insert the selectable image, receiving image data representing the selectable image, and inserting the image data at the insertion point.

In another aspect, the disclosure includes a method of receiving a virtual coupon associated with an asset. The method of this aspect includes establishing a short range wireless connection with a gaming system, the gaming system being configured to display a virtual world on a video display, and to display a tagged image within the video display of the virtual world, the tagged image being associated with an asset, upon establishing the wireless connection with the gaming system, receiving information related to one or more of the tagged image and the asset with which the tagged image is associated, storing the received information in memory, and transmitting or displaying the stored information.

In another aspect, the disclosure includes a method of distributing advertising coupons. The method of this aspect includes receiving a digital coupon, the digital coupon comprising image data and information relating the digital coupon to an asset, the digital coupon further comprising rules associated with limiting the distribution of the digital coupon. The method of this aspect further includes displaying a virtual world on a video display, displaying the image of the digital coupon within the virtual world on the video display, receiving an input from a input device indicating selection of the digital coupon image by a user interacting with the virtual world, determining that the digital coupon can be distributed by evaluating the rules limiting the distribution of the digital coupon, and upon determining that the digital coupon can be distributed, wirelessly communicating information to a mobile device, the communicated information related to one or more of the tagged image and the asset with which the tagged image is associated.

In another aspect, the disclosure includes a system for distributing advertising coupons. The system of this aspect includes a network interface configured to receive a digital coupon, the digital coupon comprising image data and information associating the digital coupon to an asset, the digital coupon further comprising rules associated with limiting the distribution of the digital coupon. The system further includes a video subsystem configured to display a virtual world on a video display, and to display the image of the digital coupon within the virtual world on the video display, an input interface configure to receive an input from a input device indicating selection of the digital coupon by a user interacting with the virtual world, a coupon distribution module configured to determine that the digital coupon can be distributed by evaluating the rules limiting the distribution of the digital coupon, and a wireless interface configured to wirelessly communicate information to a mobile device upon determining that the digital coupon can be distributed, the communicated information related to one or more of the digital coupon and the asset with which the digital coupon is associated.

BRIEF DESCRIPTION OF THE DRAWINGS

The features, objects and advantages of embodiments of the disclosure will become more apparent from the detailed description set forth below when taken in conjunction with the drawings, in which like elements bear like reference numerals.

DETAILED DESCRIPTION OF THE INVENTION

Figure 1:
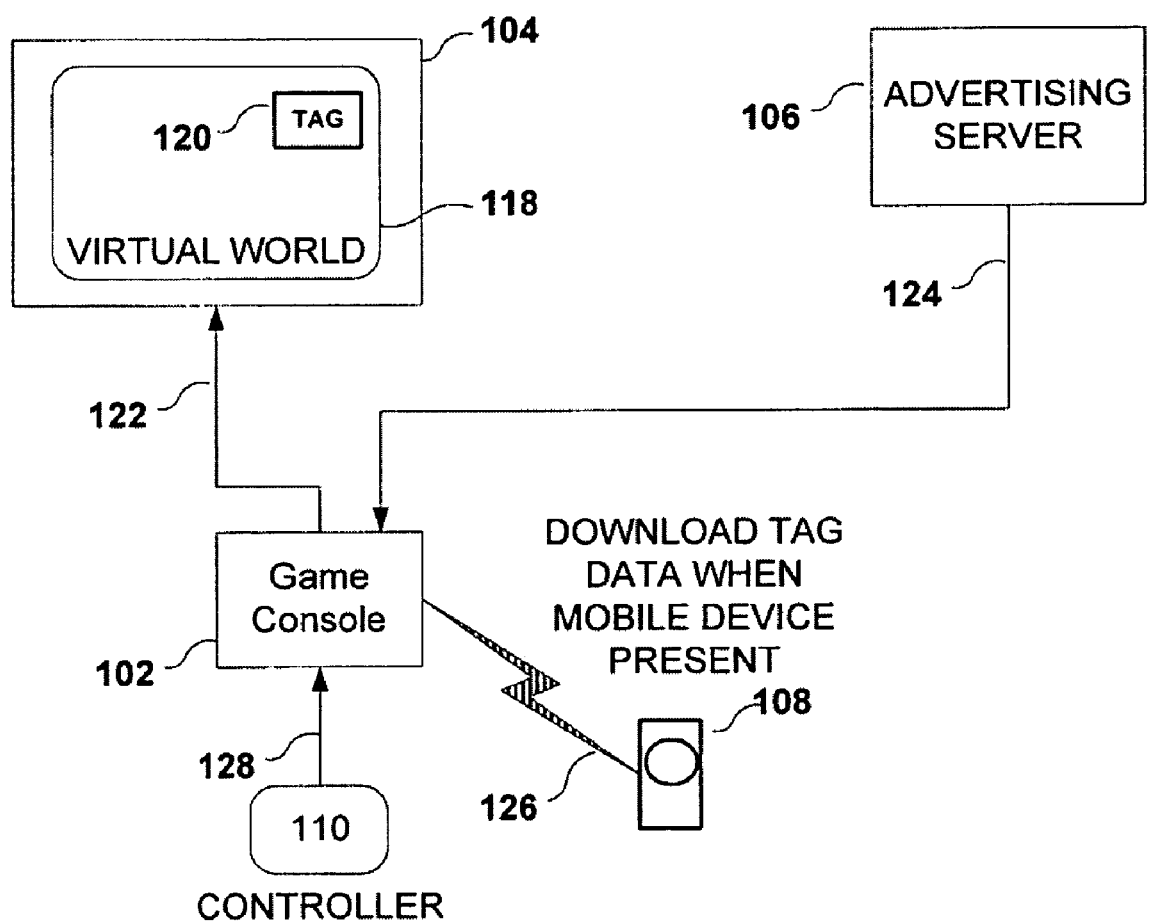
FIG. 1 is a block diagram illustrating an example system in which a game console displays a virtual world on a video display, the virtual world including selectable images that are linked to one or more assets.

FIG. 1 is a block diagram illustrating an example system 100 in which a game console 102 displays a virtual world 118 on a video display 104, the virtual world 118 including tagged images 120 that are linked to one or more assets. The game console 102 is an interactive computer or electronic device that drives the video display 104 via a communication link 122 to display a virtual world. The communication link 122 can be a wire line (e.g., USB, or a cable) or a wireless connection (e.g., 802.x, Bluetooth, or any wireless communication technology).

The game console 102 can receive inputs form one or more game controllers 110. The game controller 110 is connected to the game console 102 via a communication link 128. The communication link 128 can be a wire line connection (e.g., USB, or a cable) or a wireless connection (e.g., 802.x, Bluetooth, or any wireless communication technology). The game controller 110 can include one or more input devices such as a joystick, a mouse, toggle switches, etc.

The video display 104 can be a raster scan device such as a television, including high definition television. However, the video display 104 can be any type of display using any type of display format.

The virtual world displayed on the video display 104 can be a game environment such as a two dimensional or three dimensional virtual world where a user can manipulate and interact with on screen objects by providing inputs to the virtual world through the game controller 110. The virtual world can also by an educational sequence of images and/or videos where the user progresses through the educational course based on interactions with on screen buttons, menus, etc. The virtual world can also be a commercial tour such as a store, catalog or warehouse where the user progresses through a virtual shopping spree through the catalog or store or warehouse. Other virtual worlds can also be depicted.

Regardless of what type of virtual world is being displayed and interacted with, the virtual world includes the tagged images 120. The tagged image 120 is an object that the user can select, move, manipulate, or interact with in multiple ways by using one or more input mechanisms of the controller 110.

In one aspect, the tagged image 120 is a integrated part of the virtual world scene. For example, if the virtual world is a game environment, the selectable image may be a billboard along side of a road on which the user is driving a virtual vehicle. alternatively, the tagged image 120 could be a picture of the asset itself, such as a beverage container, a pizza, a restaurant, etc.

In another aspect, the tagged image 120 is a separate image, e.g., a window, that is removed from, adjacent to, or at least not integrated to be part of the main scene of the virtual world. For example, the virtual world may be a catalog of products and the tagged image 120 may be a separate window on the side of the page that displays special offers that may be related to or in competition with products that the user is currently looking at. In another example, If the virtual world is an educational program, the tagged image 120 may be a separate window that displays products that could be suggested tools or educational material from which the user may benefit in regards to the subject matter that is being taught.

The tagged image 120 is, in one way or another, related to an asset. The asset can be a digital asset such as music, literature, a movie, video, etc. The asset could be a physical asset such as electronics, food, books, appliances, furniture, etc. The asset could be a service such as financial services, vacation planning, travel, entertainment, tickets, etc. In terms of any of the digital assets, the asset could be a user generated asset, where the user could be a player of the game, a member of a club or organization associated with the virtual catalog or educational material that the virtual world is representing.

In addition to the property of being related to an asset, the tagged image 120 is also related to a redemption property, the redemption property being related to enabling the user to obtain or giving the user the right to obtain the asset with which it is related. The redemption property may be a discount on the asset, a certificate to obtain the asset for free, an award in points (e.g., credit card award points) for purchasing the product, or some other economic, monetary, or legal right to obtain the asset.

As discussed above, when the user wants to select, activate, or in some way manipulate the tagged image 120, the user inputs a signal of some kind into the controller 110. The selecting input could be a mouse click when a cursor is positioned on the selectable object. The selecting input could be simply actuating a designated switch on the controller 110. Other inputs could be used to signify that the user is selecting the tagged image 120 being displayed.

Upon the user selecting the tagged image 120, the game console 102 detects the input signal. The detection can be any form of signal detection typically used between a computer and peripheral input devices such as, for example, a joystick, a keyboard, a mouse, touchpad, toggle switches, track ball, scroll wheel, etc.

The system 100 also includes a mobile device 108. As used herein, a mobile device refers to a device such as a cellular or other wireless communication device, personal communication system (PCS) device, personal navigation device, laptop or other suitable mobile device capable of receiving and processing wireless signals such as cellular, satellite, wide area networks, metropolitan area networks, etc. The term "mobile device" is also intended to include devices which communicate with a personal navigation device (PND), such as by short-range wireless (e.g., local area networks or personal area networks), infrared, wireline connection, or other connection. Also, "mobile device" is intended to include all devices, including wireless communication devices, computers, laptops, etc. which are capable of communication with a server, such as via the Internet, WiFi, or other network. Any operable combination of the above are also considered a "mobile device."

The game console 102 and the mobile device 108 collaborate, e.g., using a device discovery protocol, to establish a communication link 126 between the game console 102 and the mobile device 108. In one aspect, the communication link 126 is established after the selection of the tagged image 120. In another aspect, the communication link 126 can be established any time the mobile device 108 and the game console are within range. In yet another aspect, the communication link 126 can be established on a periodic basis, or on a pseudo random basis.

The establishment of the communication link 126 can utilize any of various device discovery protocols and can be initiated by either the game console 102 or the mobile device 108. In one aspect, the game console 102 detects the presence of the mobile device 108 and the game console can initiate the establishment of the communication link. In another aspect, the mobile device 108 can initiate establishment of the communication link 126, e.g., by sending a paging signal. In either aspect, the game console 102 detects the presence of the mobile station 108.

Upon detecting the mobile device 102 and establishing the communication link 126, the game console 102 can wirelessly communicate information to the mobile device 108, the communicated information related to one or more of the tagged image and the asset with which the tagged image is associated. In one aspect, the tagged image itself can be the information that is communicated to the mobile device 108. For example, the tagged image could be a bar code that may later be displayed by the wireless device (or some other display device) and the barcode could be scanned and the code looked up in a database to identify the redemption property information discussed above (e.g., a discount on the price of the asset, a right to obtain the asset, etc.).

In another aspect, the tagged image could be a watermarked image and the communicated information could be this watermarked image. When the watermarked image data is later provided by the user to a store or website, the watermark will verify that this is an authentic virtual coupon and not a copy.

In some aspects, the communicated information can be derived from the tagged image. For example, the communicated information could be a hash function of the tagged image. This hash function could then be used to identify the asset and the redemption deal that is being offered by the virtual coupon. Alternatively, the communicated information could include a digital certificate. In the case of a digital certificate, the user could check with a trusted certificate authority to verify that the issuer of the tagged image is legitimate and trusted. The communicate information could include combinations of any of the examples discussed above as well as other information related to the asset or the redemption property.

The system 100, in some aspects, also includes one or more advertising servers 106. The advertising server 106 can be a third party that represents several commercial entities or it could be one of the commercial entities. The advertising server can be connected to the game console 102 via a network 124. The network 124 could be any wired or wireless medium. The network 124 could include the Internet, an intranet, or any other type of network.

The advertising server 106 can provide data representing the tagged images and the associated assets to the game console 102. In this way the tagged images 120 and/or assets can be changed from time to time. The tagged images 120 could be changed based on the identity of the user. The tagged images could by changed based on a past history of other tagged images 120 that were selected by a user.

In some aspects, the advertising server 106 can provide distribution rules associated with the tagged images 120. In this way the distribution of the virtual coupons that the tagged images represent can be controlled. For example, the rules could limit the number of coupons distributed, or limit to which users the coupons are distributed.

Figure 2:
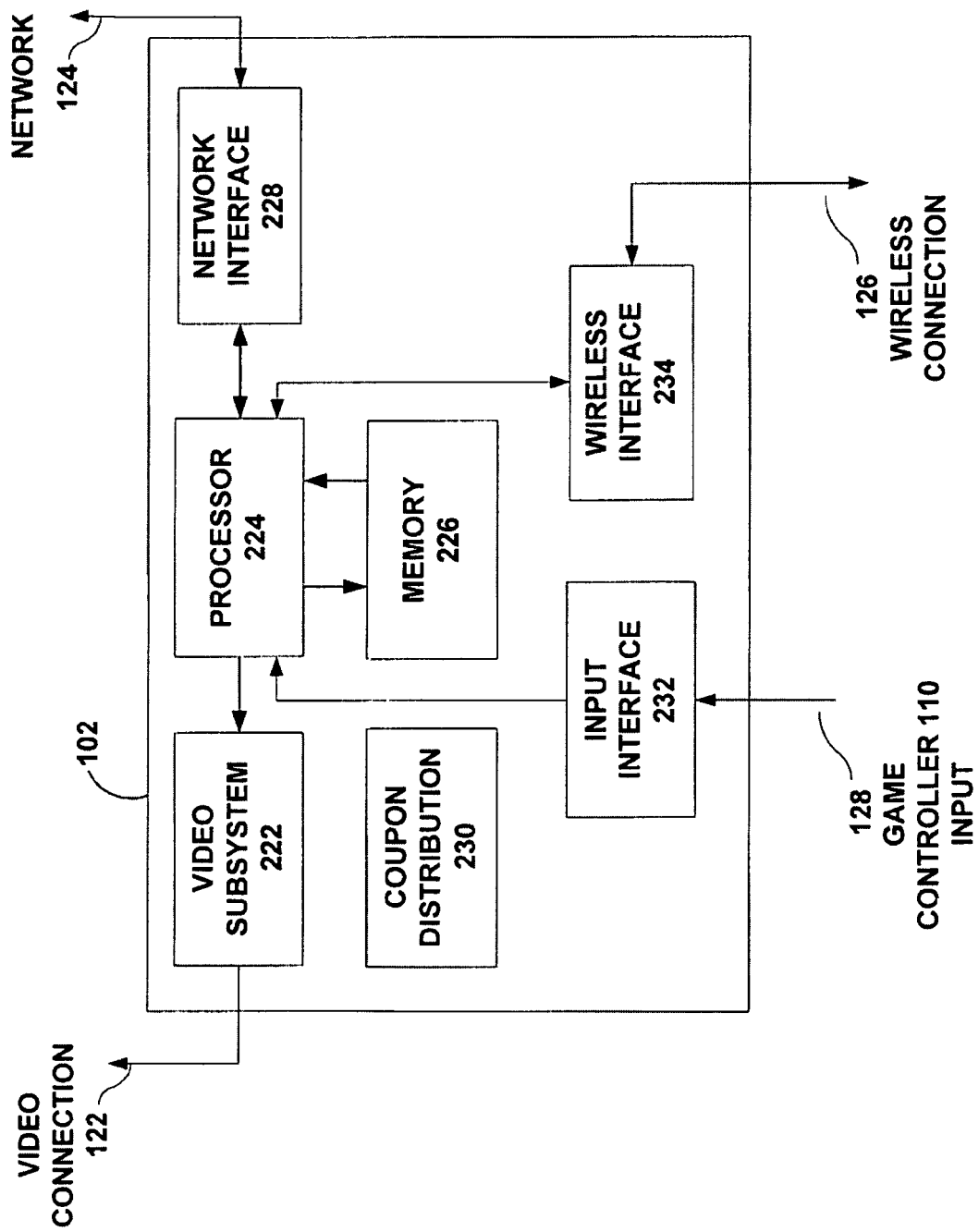
FIG. 2 is a functional block diagram of an example of a game console apparatus for displaying a virtual world on a video display, the virtual world including selectable virtual coupons that are downloadable to a mobile device.

FIG. 2 is a functional block diagram of an example of a game console apparatus, such as the game console 102 of FIG. 1, for displaying a virtual world on a video display, the virtual world including selectable virtual coupons that are downloadable to a mobile device. In this example, the game console 102 includes one or more processors 224. The processor 224 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other, electronic units, or a combination thereof.

The processor 224 is configured to store data received by one or more interfaces and process and store the data on a memory 226. The memory 226 can be implemented within the processor 224 or external to the processor 224. As used herein, the term memory refers to any type of long term, short term, volatile, nonvolatile, or other memory and is not to be limited to any particular type of memory or number of memories or type of media upon which memory is stored.

The processor 224 is also configured to communicate data and/or instructions to and/or from a video subsystem 222, a network interface 228, a wireless interface 234 and an input interface 232. The video subsystem 222 is configured to provide video and audio data to the video display 104 over the video connection 122. The video subsystem 222 receives various instructions from the processor 224. The instructions can include user inputs used to affect the sequence of events of the virtual world that is being displayed. Using the inputs, the video subsystem 222 executes the virtual world instructions to display the resulting video and audio sequence on the video display 104.

The video subsystem 222 can interface with a virtual world subsystem (not shown). The virtual world subsystem could be in the form of software, hardware and/or firmware. In the case of the virtual world subsystem comprising software, the virtual world software could be contained in internal memory such as the memory 226. The virtual world subsystem could also be an external device such as a video cartridge, video DVD or CD, or other form of interactive video device. The video output of the video subsystem 222 is determined by the interactions between the video subsystem 222 and the virtual world subsystem and depends on the user inputs that are received.

The input interface 232 is configured to receive signals from the game controller 110 over the communication link 128. As discussed above, the game controller 110 can include one or more types of input devices including, for example, a joystick, a keyboard, a mouse, touchpad, toggle switches, track ball, scroll wheel, etc. In one aspect, the user input signals received by the input interface 232 can be forwarded to the processor 224 as they are received. In other aspects, the input interface 232 can process the received input and transform them into another format before forwarding the transformed inputs to the process. For example, the received inputs can be analog signals, the input interface can transform these to digital signals in a predetermined format.

The network interface 224 is configured to transmit and receive data over the network 124. The network 124 can include one or more wired and/or wireless networks. In one aspect, the network is used to communicate with the advertisement server 106 as illustrated in the example system 100 of FIG. 1. The network interface 224 can receive the information representing the tagged images and the related assets.

The wireless interface 234 is configured to transmit and receive data over the wireless connection 126 discussed above. The wireless interface 234 can transmit the information related to the selected tagged images to the mobile device 108. In addition the wireless interface 234 can also transmit and receive signals necessary for establishing and maintaining the communication link 126 between the game console 102 and the mobile device 108. The wireless interface can be configured to communicate over a short range wireless network such as an IEEE 802.11x network, a Bluetooth network, an IEEE 802.15x, or some other type of network.

The processor 224 is also configured to perform instructions for executing the methods of a coupon distribution module 230. The coupon distribution module 230 can include firmware and/or software implementations of the methodologies discussed below. In the case of software implementations, the software code of coupon distribution module 230 can be stored on the memory 226.

In one aspect, the coupon distribution module 230 can analyze the stored records of one or more past tagged images or assets selected by the user or users interacting with the virtual world. The analysis can include determining classes of assets that the user is or is not interested in based on patterns of assets that are selected. In this way, The coupon distribution module 230 can determine a class of asset or a specific asset for a tagged image to be displayed. The analysis can also include the types of images that the user or users have selected in the past. This also can be used to target specific users with specific images or classes of images.

In another aspect, the coupon distribution module 230 can enforce rules regarding distribution of coupons received from the advertising server 106. As discussed above, the rules may limit the number of virtual coupons that can be distributed, e.g., communicated to the mobile device 108, or limit to which users the virtual coupons are distributed.

In some aspects, the coupon distribution module 230 can be located entirely, or partially in the advertising server 106. In these aspects, requests can be transmitted to the advertising server 106 from the game console 102 requesting if a specific virtual coupon can be distributed. The coupon distribution module, in the advertising server 106, can then confirm or deny the distribution request. In these aspects, the information that is to be communicated to the mobile device 108 can be transmitted to the game console 102 or directly to the mobile device 108 from the advertising server 106.

Figure 3:
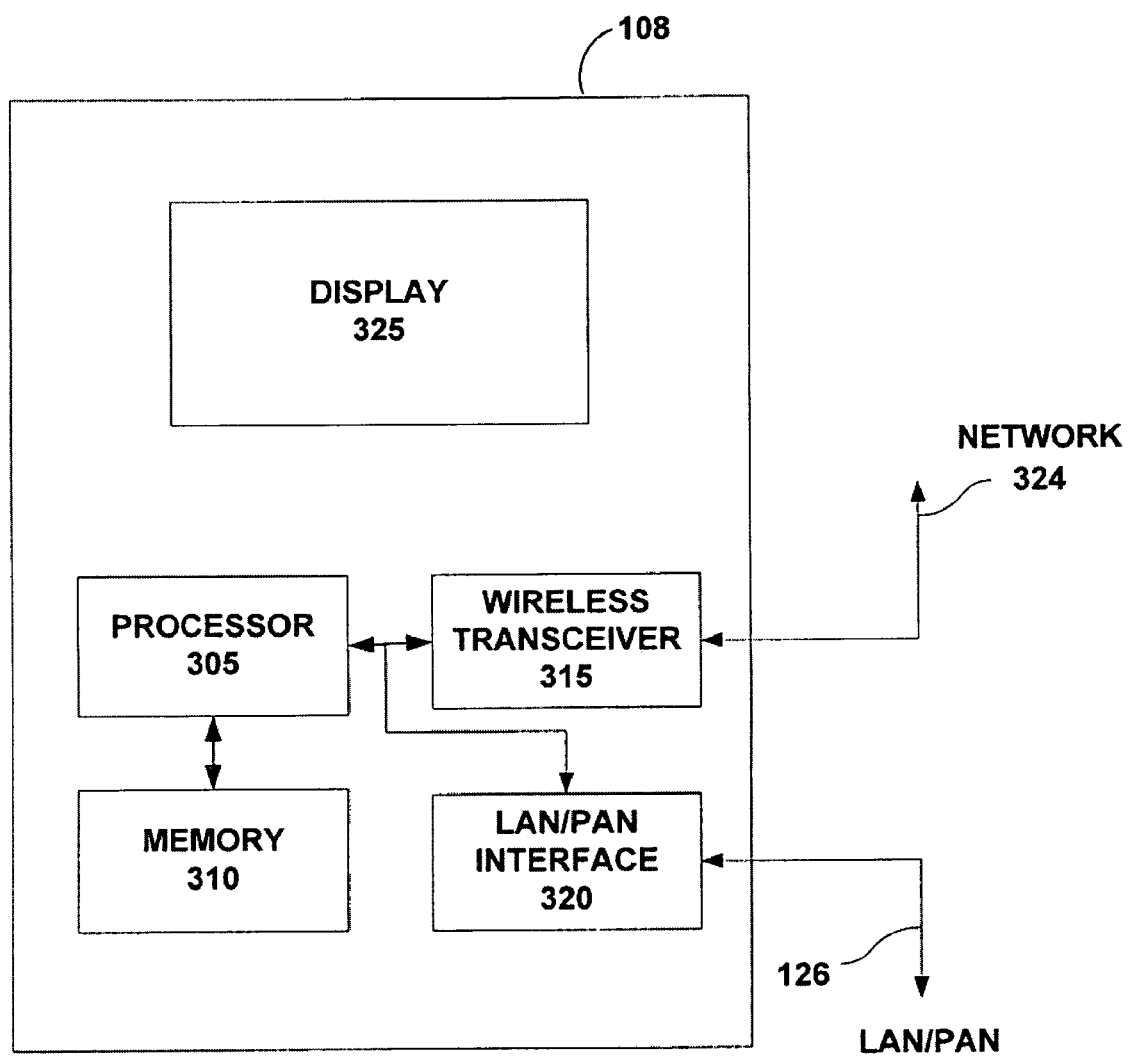
FIG. 3 is a functional block diagram of a mobile device for receiving virtual coupons in the system of FIG. 1 or from the game console apparatus of FIG. 2.

FIG. 3 is a functional block diagram of a mobile device 108 for receiving virtual coupons in the system 100 of FIG. 1 or from the game console 102 of FIG. 2. In this example, the mobile device 108 includes one or more processors 305, a wireless transceiver 315, a local area network (LAN) or a personal area network (PAN) interface 320, and optionally a display 325. The processor 305 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other electronic units, or a combination thereof.

The processor 305 is configured to store data received by the wireless transceiver 315 and the LAN/PAN interface 320 and process and store the data on a memory 310. The memory 310 can be implemented within the processor 305 or external to the processor 305. As used herein, the term memory refers to any type of long term, short term, volatile, nonvolatile, or other memory and is not to be limited to any particular type of memory or number of memories or type of media upon which memory is stored.

The processor 305 can also be configured to drive the display 325 to display graphics associated with the user interface of the mobile device 108 as well as data related to data received by the network interface 315 or the LAN/PAN interface 320. For example, the information related to the tagged image that is communicated to the mobile device 108 from the game console 102 can be displayed on the display 325 (e.g., for proof of possession at time of redemption)

The wireless transceiver 315 can be configured to receive and transmit over a wireless network 324. The wireless transceiver 315 can be configured to operate over any of several networks including a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available.

The wireless transceiver 315 can be omitted in some aspects of mobile devices 108. For example, PDA's, laptop computers, and navigation devices do not necessarily include the wireless transceiver 315.

The LAN/PAN interface 320 can be configured to receive and transmit over a wireless LAN or PAN or other type of short range wireless network. Such short range wireless networks include an IEEE 802.11x network, a Bluetooth network, an IEEE 802.15x, or some other type of network.

Figure 4A:
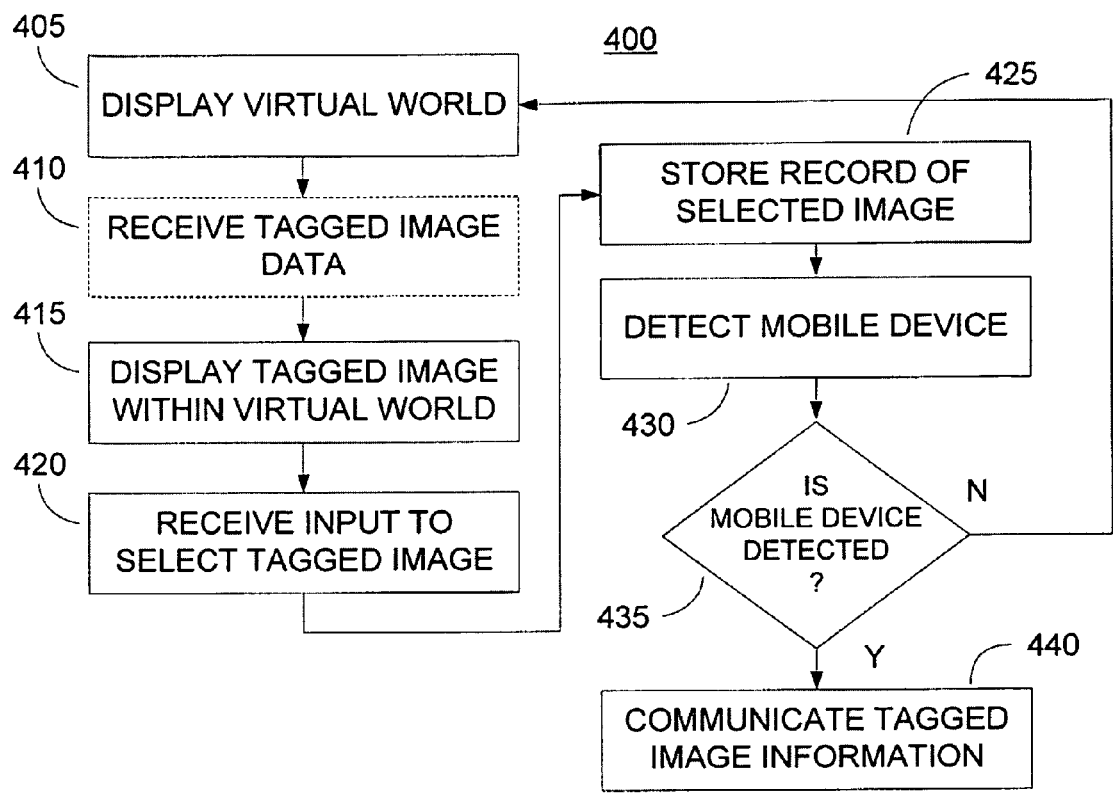
FIG. 4A-4B are flowcharts illustrating an example of a method of providing a virtual coupon associated with an asset.

FIG. 4A is a flowchart illustrating an example of a method of providing a virtual coupon associated with an asset. The process 400 can be executed, for example, on the game console 102 of FIGS. 1 and 2.

The process 400 starts at block 405, where the video subsystem 222 displays a virtual world on the video display 104. The virtual world can be a game environment, an educational video, a catalog, a tour through a virtual shopping warehouse or mall, etc.

In one aspect, the network interface 228 receives tagged image data, at optional block 410, over the network 124. The tagged image data can include data representing the tagged image and information relating the tagged image to an associated asset. The tagged image data can be compressed image data or uncompressed image data. The tagged image data can be a still image or a video sequence of images. Compressed image data can be received in formats including JPEG, MPEG-x, H.26x and others. The tagged image data can be an image of the asset, an image of a seller or owner of the asset, a water marked image, an image of a barcode, or any other image.

The information related to the associated asset can be a serial number, a hash function, a bar code, a product ID or any other data that can be associated with an asset. In some aspects, the image itself can be an indirect indicator of the related asset. For example, the image could be a barcode, a serial number or alphanumeric code that can be linked to an asset and a redemption property within a database.

In one aspect, tagged image data received at the optional block 410 can be received from the advertising server 106. In another aspect, the tagged data can be received from a cable television or satellite television provider, via a set top box, for example.

In aspects where optional block 410 is omitted, the process 400 proceeds directly to block 415 from block 405. In these aspects, the tagged image data can be stored in memory, internal or external, that is available to the game console 102.

At block 415, the video subsystem 222 displays the tagged image data within the virtual world being displayed on the video display 104. The design of the virtual world hardware, firmware and/or software with which the video subsystem is interfacing determines how the tagged image data is displayed within the virtual world. In one aspect, the tagged image data is integrated into the virtual world scene. For example, if the virtual world is a game environment, the selectable image may be a billboard along side of a road on which the user is driving a virtual vehicle, alternatively, the tagged image data could be a picture of the asset itself, such as a beverage container, a pizza, a restaurant, etc.

In another aspect, the tagged image data is displayed as a separate image, e.g., a window, that is removed from, adjacent to, or at least not integrated to be part of the main scene of the virtual world. For example, the virtual world may be a catalog of products and the tagged image data may be displayed in a separate window on the side of the page that displays special offers that may be related to or in competition with products that the user is currently looking at. In another example, If the virtual world is an educational portion, the tagged image data may be displayed as a separate window that displays products that could be suggested tools or educational material from which the user may benefit in regards to the subject matter that is being taught.

The virtual world can continue to be displayed at block 405 with the display being updated as determined by inputs received from the user via game controller 110. The tagged image can be displayed continuously or intermittently. New tagged images can be displayed at block 415 as the virtual world scene changes. The new tagged images can be received at the optional block 410. The functions of the blocks 405, 410 (optional) and 415 can continue until the user selects one of the tagged images.

Upon the user selecting the fagged image, the process 400 continues to block 420 where the input interface 232 receives an input signal from the game controller 110. In one aspect, the received input signal can be processed by the processor 224 and forwarded to the video subsystem 222. The video subsystem can determine that the input signal indicates that the user has selected the tagged image. In another aspect, the processor can determine that the tagged image has been selected.

Upon the input being received at the block 420, the process 400 continues to block 425 where the processor 224 stores, in the memory 226, information related to the tagged image that was selected. The stored information can include a record of the tagged image. The record of the tagged image could include data representing the image itself, data representing a code derived from the tagged image, or a digital signature.

The stored information can include a record of the asset associated with the tagged image. The record of the associated asset can be a serial number, a hash function, a bar code, a product ID or any other data that can be associated with an asset. In some aspects, the record of the tagged image itself can be an indirect indicator of the related asset. For example, the image could be a barcode, a serial number or alphanumeric code that can be linked to an asset and a redemption property within a database.

At block 430, the wireless interface 234 detects a mobile device, e.g., the mobile device 108 of FIG. 1. The detection of the mobile device can include a wireless discovery protocol of a short range wireless network such as a short range wireless network such as an IEEE 802.11x network, a Bluetooth network, an IEEE 802.15x, or some other type of network.

Block 430 is illustrated as occurring after receiving the input at the block 420. However, this is not necessary. In one aspect, the wireless interface 234 can detect the mobile device prior to receiving the input. In another aspect, the wireless interface 234 can detect the mobile device after receiving the input at the block 420.

The process 400 continues to the decision block 435. If the mobile device is not detected, the process 400 will loop back and continue to perform the functions of blocks 405, 410 (optional), 415, 420 and 425. If the mobile device is detected, the process 400 continues to block 440. At the block 440, the wireless interface 234 wirelessly communicates information relate to one or more of the tagged image and the asset with which the tagged image is associated to the mobile device. The wireless interface 234 can communicate the information over a short range wireless network such as an IEEE 802.11x network, a Bluetooth network, an IEEE 802.15x, or some other type of network.

The information that is communicated to the mobile device at the block 440 can be all or a part of the information that was stored at the block 425. If information related to multiple tagged images has been stored before the mobile device was detected at the block 430, then all of the stored sets of data can be communicated to the wireless device at the same time. Upon completing the communication of the information at the block 440, the process 400 can continue as discussed above.

Figure 4B:
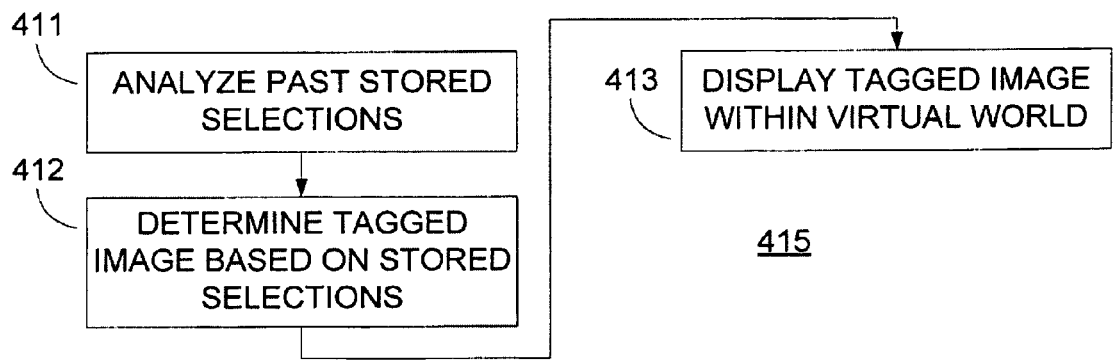

Instead of merely displaying the same tagged images related to the same assets during the sequence of the virtual world, the images and/or assets can be changed. In one aspect, a user's past tagged image selections can be used as an indicator of what types of images and/or related assets should be displayed at the block 415. FIG. 4B is a flowchart illustrating an example of a method of providing a virtual coupon associated with an asset based on past tagged images selected by the user.

At block 411, the coupon distribution module 230 analyzes the stored records of one or more past tagged images or assets that were selected by the user interacting with the virtual world. The information that was stored at the block 425 in the process 400 can be used for this purpose. The stored information can include information identifying the images or types of images that were selected by the user. The stored information can also include information identifying the type of asset or specific assets that were previously selected.

The coupon distribution module 230 can analyze the selected images at the block 411 in order to identify classes of images that are most often selected by the user. For example, a user may be more attracted to animal images, fine art images, celebrity images, images of natural wonders, aquatic images, mountain images, sports images, or any other types of images. By analyzing which types of images are selected most often, the images can be chosen to increase the odds of being selected by the user.

The coupon distribution module 230 can analyze the assets associated with the selected images at the block 411 in order to identify classes of assets that are most often selected by the user. For example, a user may be more interested in assets associated with electronics, computers, cameras, books, music (rock and roll, classical, country, ethnicities, etc.), clothing, DVDs, jewelry, home and garden, gifts, sports equipment, toys, tools, food, automobiles, etc. By analyzing which types of assets are selected most often, the related assets can be chosen to increase the odds of being selected by the user.

At block 412, the coupon distribution module 230 determines the tagged image and/or related asset to be displayed based on a relationship to the images or assets selected by the user in the past. The relationships can be determined by the analysis done at the block 411 as discussed above.

Upon determining the tagged image and/or asset to be displayed, the coupon distribution module 230 forwards data representing the tagged image, and possibly information related to the asset, to the video subsystem 222 to be displayed with in the virtual world at block 413. The remainder of the process 400 can continue as discussed above.

In one aspect, the analysis performed at the block 411 can include stored tagged image selections from all of the virtual worlds that the user has viewed in the past. In another aspect, the analysis can be based only on selections previously made in the virtual world that is currently being viewed by the user. In this aspect, the tagged images and/or assets can be chose to correlate with the virtual world that is being viewed. This can possibly further improve the odds of the tagged images being selected by the user.

It should be noted that the blocks of method 400 in FIGS. 4A and 4B can be rearranged, combined, modified and in some cases omitted.

Figure 5:
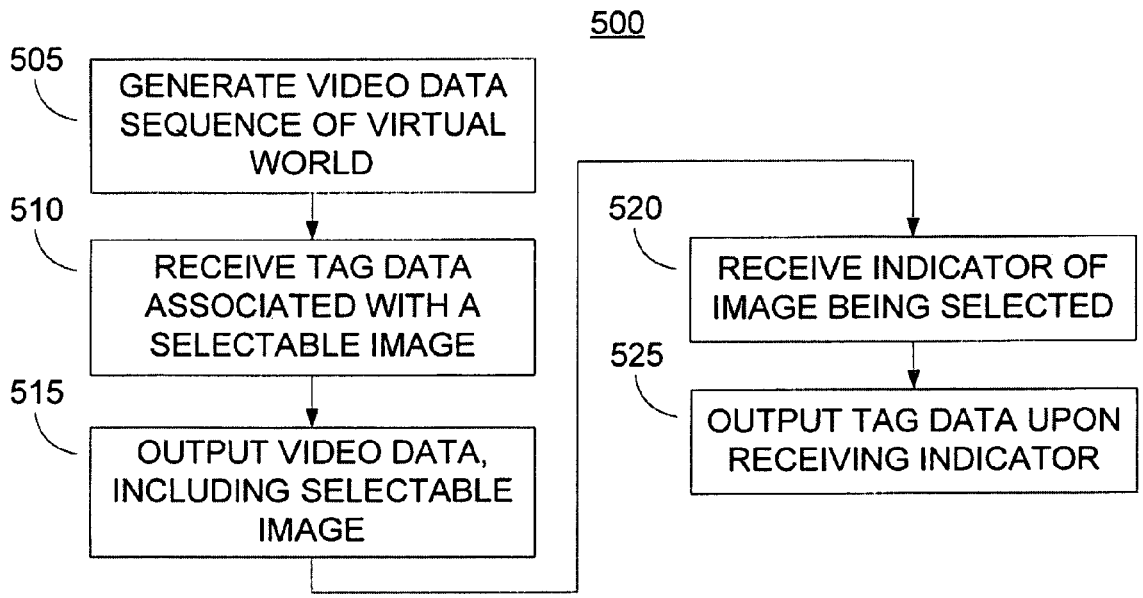
FIG. 5 is a flowchart illustrating an example of a method of controlling a virtual world video sequence, the method enabling insertion of user selectable images into the video sequence.

FIG. 5 is a flowchart illustrating an example of a method 500 of controlling a virtual world video sequence, the method enabling insertion of user selectable images into the video sequence. This method can be performed, for example, by a virtual world subsystem that is a part of or interfaced with the game console 102 of FIGS. 1 and 2. The virtual world subsystem could be in the form of software, hardware and/or firmware. In the case of the virtual world comprising software, the virtual world software could be contained in internal memory such as the memory 226 of the game console 102. The virtual world subsystem could also be an external device such as a video cartridge, video DVD or CD, or other form of interactive video device.

The process 500 starts at block 505 where the virtual world subsystem generates video data representing a sequence of a virtual world. The video that is generated can depend on various inputs received by the virtual world subsystem. The received inputs generally relate to user inputs that are input to the game controller 110 and processed and forwarded to the virtual world (e.g., by the processor 224 and/or the video subsystem 222).

At block 510, the virtual world subsystem receives tag data associated with a selectable image within the video data. The tag data is associated with an asset. As discussed above, the tag data associated with the asset can be a serial number, a hash function, a bar code, a product ID or any other data that can be associated with an asset. In some aspects, the selectable image itself can be an indirect indicator of the associated asset. For example, the selectable image could be a barcode, a serial number or alphanumeric code that can be linked to an asset and a redemption property within a database.

In one aspect, image data representing the user selectable image is also received at the block 510. In this aspect, the virtual world subsystem is configured to provide an insertion point within the video sequence where the received user selectable image data can be inserted. In this way, the virtual world subsystem can display any image that is received before or during execution of the virtual world sequence. When the user generated inputs received by the virtual world subsystem result in the video sequence arriving at the insertion point, the received image data is inserted and subsequently output with the other video data at block 515.

At the block 515, the virtual world subsystem outputs video data including the user selectable image. In one aspect, the user selectable image is an integrated part of the virtual world scene. For example, if the virtual world is a game environment, the selectable image may be a billboard along side of a road on which the user is driving a virtual vehicle. alternatively, the tagged image 102 could be a picture of the asset itself, such as a beverage container, a pizza, a restaurant, etc.

In another aspect, the user selectable image is a separate image, e.g., a window, that is removed from, adjacent to, or at least not integrated to be part of the main scene of the virtual world. For example, the virtual world may be a catalog of products and the user selectable image may be a separate window on the side of the page that displays special offers that may be related to or in competition with products that the user is currently looking at. In another example, If the virtual world is an educational portion, the user selectable image may be a separate window that displays products that could be suggested tools or educational material from which the user may benefit in regards to the subject matter that is being taught.

The virtual world subsystem continues to perform the functions at the blocks 505, 510 and 515, until it receives an indicator of one of the user selectable images being selected at block 520. The received indicator can be a single bit field in a packet that is set to a value indicating that the selectable image has been selected. The indicator may also include information identifying the image that is selected, in cases where more than one image is displayed.

Upon receiving the indicator at the block 520, the process continues to block 525 where the virtual world subsystem outputs tag data associated with the user selectable image. The output data can include a record of the tagged image. The record of the tagged image could include data representing the image itself, data representing a code derived from the tagged image, or a digital signature. The output information can include a record of the asset associated with the tagged image. The record of the associated asset can be a serial number, a hash function, a bar code, a product ID or any other data that can be associated with an asset. In some aspects, the record of the tagged image itself can be an indirect indicator of the related asset. For example, the image could be a barcode, a serial number or alphanumeric code that can be linked to an asset and a redemption property within a database.

Subsequent to outputting the information at the block 525, the virtual world subsystem can continue performing the functions at the blocks 505-515 until another selectable image is selected by the user. It should be noted that the blocks of the method 500 can by rearranged, combined, modified and in some cases omitted.

Figure 6:
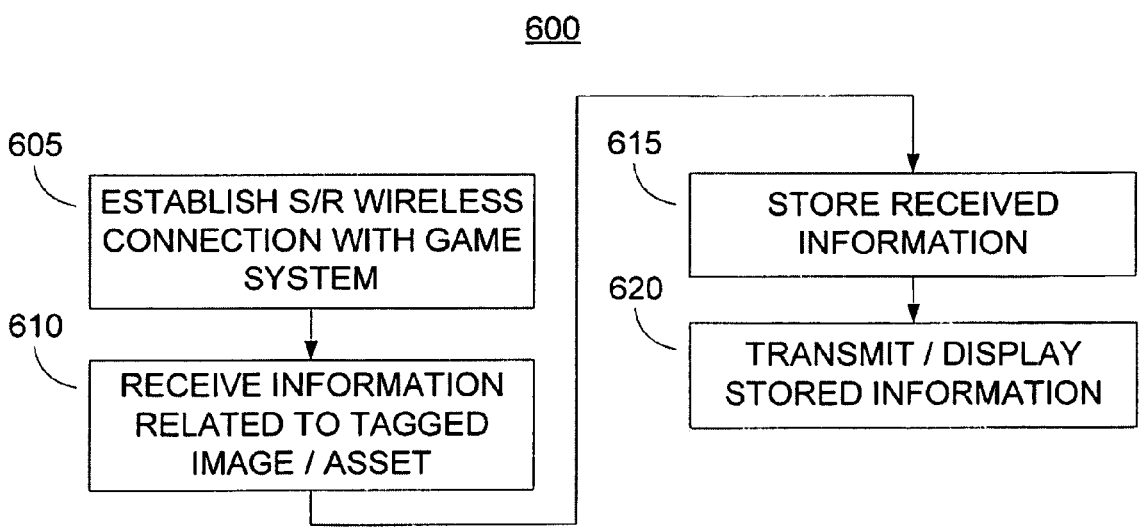
FIG. 6 is a flowchart illustrating an example of a method of receiving a virtual coupon associated with an asset.

FIG. 6 is a flowchart illustrating an example of a method 600 of receiving a virtual coupon associated with an asset. The method 600 can be performed, for example, by the mobile device 108 of FIGS. 1 and 3. The method 600 starts at block 605 where a short range wireless interface, such as the LAN/PAN interface 320 of the mobile device 108, establishes a short range wireless connection with a gaming system, such as the game console 102 of FIGS. 1 and 2. The short range wireless connection can be over a network such as n IEEE 802.11x network, a Bluetooth network, art IEEE 802.15x, or some other type of network.

The establishment of the short range wireless connection can utilize any of various device discovery protocols and can be initiated by either the game console 102 or the mobile device 108. In one aspect, the game console 102 detects the presence of the mobile device 108 and the game console can initiate the establishment of the short range wireless connection. In another aspect, the mobile device 108 can initiate establishment of the short range wireless connection, e.g., by sending a paging signal.

Subsequent to the establishment of the short range wireless connection at the block 605, the process 600 continues to block 610, where the LAN/PAN interface 320 receives information related to one or more of a tagged image and the asset with which the tagged image is associated. The tagged image can be one of the tagged images selected by the user interacting with the virtual world being displayed by the game console 102. In one aspect, the tagged image itself can be the information that is received by the mobile device 108. For example, the tagged image could be a bar code that may later be displayed by the wireless device (or some other display device) and the barcode could be scanned and the code looked up in a database to identify the redemption property information discussed above (e.g., a discount on the price of the asset, a right to obtain the asset, etc.).

In another aspect, the tagged image could be a watermarked image and the received information could be this watermarked image. When the watermarked image data is later provided by the mobile device 108, e.g., by displaying or transmitting the image data, to a store or website, the watermark will verify that this is an authentic virtual coupon and not a copy.

In some aspects, the received information can be derived from the tagged image. For example, the received information could be a hash function of the tagged image. This hash function could then be used to identify the associated asset and the redemption deal that is being offered by the virtual coupon. Alternatively, the received information could include a digital certificate. In the case of a digital certificate, the user could check with a trusted certificate authority to verify that the issuer of the tagged image is legitimate and trusted. The information received at the block 610 could include combinations of any of the examples discussed above as well as other information related to the asset or the redemption property. Upon receiving the information at the block 610, the short range wireless connection can be broken After receiving the information at the block 610, the process 600 continues to block 615 where the processor 305 stores the information in the memory 310.

Subsequent to storing the information at the block 615, the process 600 continues to block 620 where the mobile device 108 can display the stored information on the display 325 or transmit the stored information. This can be performed at the time that the virtual coupon is being redeemed at a store or at a website, for example.

The stored information can be displayed in cases where the stored information is readable, viewable or scannable. For example in cases where the stormed information is an image of a barcode, an alphanumeric code, or the tagged image of the asset, by displaying the stored information can allow a store clerk to view, read or scan the displayed image and redeem the virtual coupon.

In cases where the stored information is transmitted at the block 620, either the wireless transceiver 315 or the LAN/PAN interface 320 can be used. The stored information can be transmitted to a website in order to redeem the virtual coupon.

It should be noted that the blocks of the method 600 can be rearranged, combined, modified and in some cases omitted.

Figure 7:
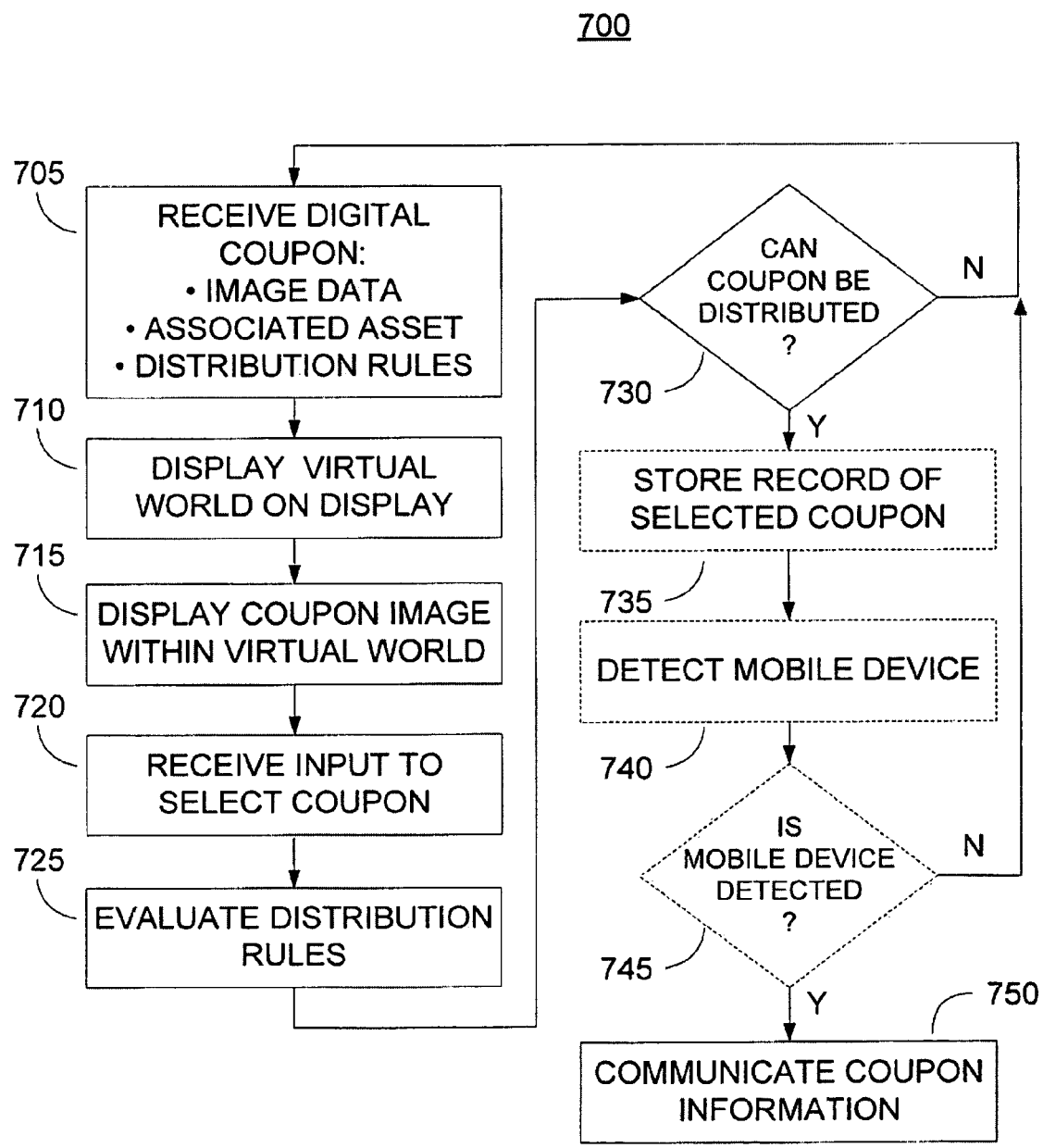
FIG. 7 is a flow chart of another method of distributing advertising coupons.

FIG. 7 is a flow chart of another method 700 of distributing advertising coupons. The method 700 can be performed, for example, by the game console 102 of FIGS. 1 and 2. The method 700 is similar in many respects to the method 400 discussed above in reference to FIG. 4A. However, the method 700 differs form the method 400 in that the digital coupon (i.e., tagged image) has distribution rules associated with how the digital coupon is to be distributed.

At block 705, the network interface 228 of the game console 102 receives information related to the digital coupon. Part of the received information is related to the tagged image and/or the associated asset. This information can be the same as the information received at the optional block 410 discussed above. The additional received information is related to distribution rules.

The distribution rules can limit the number of digital coupons that are distributed. The distribution rules can limit distribution of the digital coupon to certain users. In some aspects, the distribution rules can specify to which users to display the digital coupon or to which users not to display the digital coupon. Other types of distribution rules can also be received at the block 705.

At block 710, the video subsystem 222 displays the virtual world on the video display 104. The functions performed at the block 710 can be the same as those described above in reference to the block 405 in the process 400 of FIG. 4A. If the distribution rules relate to when and to who the digital coupon can be displayed, the coupon distribution module 230 can determine if the digital coupon can be displayed at the block 710.

At block 715, the video subsystem 222 displays the digital coupon within the virtual world on the video display 104. The functions performed at the block 715 can be the same as those described above in reference to the block 415 in the process 400 of FIG. 4A.

At block 720, the video subsystem 222 receives an input indicating that the user interacting with the virtual world has selected the digital coupon. The functions performed at the block 720 can be the same as those described above in reference to the block 420 in the process 400 of FIG. 4A.

Upon receiving the input indicating selection of the digital coupon, the coupon distribution module 230 evaluates the received distribution rules to determine if the digital coupon can be distributed to the user. The evaluation at the block 725 can include checking the number of times that the selected digital coupon has been distributed in the past and comparing that to a limit threshold. The evaluation at the block 725 can include checking the if the user is permitted to receive the selected digital coupon.

At block 730, based on the evaluations of the distribution rules at the block 725, the coupon distribution module 230 determines if the coupon can be distributed. If it is determined that the coupon cannot be distributed, the process 700 returns to block 705 without distributing the digital coupon to the user. In one aspect, if it is determined that the coupon can be distributed, the process 700 proceeds to block 750 (skipping optional blocks 735, 740 and 745 in this aspect) and the wireless interface 234 wirelessly communicates information related to the digital coupon to a mobile device. The functions performed and the information communicated at the block 750 can be the same as those discussed above in reference to the block 440 of FIG. 4A.

In some aspects, optional blocks 735, 740 and 745 are performed prior to communicating the information at the block 750. The functions performed at the optional blocks 735, 740 and 745 can be the same as those discussed above in reference to the blocks 425, 430 and 435, respectively. It should be noted that the blocks of the method 700 can be rearranged, combined, modified and in some cases omitted.

As was described above, a short range wireless network can be utilized for communications between the mobile device 108 and the game console 102. In one aspect a Bluetooth network is used. In a Bluetooth communication system the mobile devices and other enabled devices do not constantly use one frequency channel for transmission and reception in a time division multiple access manner. The Bluetooth standard also defines a combination of Time- and Frequency-Division Multiple Access (TDMA/FDMA). A Bluetooth transceiver utilizes frequency hopping to reduce interference and fading. The channel is represented by a pseudo-random hopping sequence hopping through 79 or 23 RF channels depending on the country. The hopping sequence is unique for the PAN and is determined by the Bluetooth device address of the master. The phase in the hopping sequence is determined by the Bluetooth clock of the master. The channel is divided into time slots where each slot corresponds to an RF hop frequency.

Consecutive hops correspond to different RF hop frequencies. The nominal hop rate is 1600 hops/s. Typically, all Bluetooth devices participating in the PAN are time and hop synchronized to the channel. The channel is divided into time slots of 625 μs in length. In the time slots a master and slave can transmit packets. There are two types of links that can be established between the master and the slave: Synchronous Connection-Oriented (SCO) link and Asynchronous Connection-Less (ACL) link.

The SCO link is a point-to-point link between a master and a single slave in the PAN. The master maintains the SCO link by using reserved slots at regular intervals. As the SCO link reserves slots, it can be considered as a circuit-switched connection between the master and the slave. The SCO link typically supports time-bounded information such as voice. The master can support up to three SCO links to the same slave or to different slaves. A slave can support up to three SCO links from the same master or two SCO links if the links originate from different masters. SCO packets are never retransmitted.

The ACL link is a point-to-multipoint link between the master and all the slaves participating on the PAN. In the slots not reserved for the SCO links, the master can establish an ACL link on a per-slot basis to any slave, including the slave devices already engaged in an SCO link. The ACL link provides a packet-switched connection between the master and all active slaves participating in the PAN. Both asynchronous and isochronous services are supported. Only a single ACL link can exist between a master and a slave. As the ACL links are primarily used for data transmission, packet retransmission is applied to ensure data integrity.

The data on the PAN channel is conveyed in packets. Each packet consists of three entities: the access code, the header, and the payload. The access code and header are of fixed size, either 72 bits or 54 bits. The payload can range from zero to a maximum of 2745 bits. The access code identifies all packets exchanged on the channel of the PAN. All packets sent in the same PAN are preceded by the same channel access code.

The Bluetooth audio-interface can use either a 64 kb/s log PCM format, A-law or μ-law compressed, or a 64 kb/s CVSD (Continuous Variable Slope Delta Modulation) format.

Figure 8:
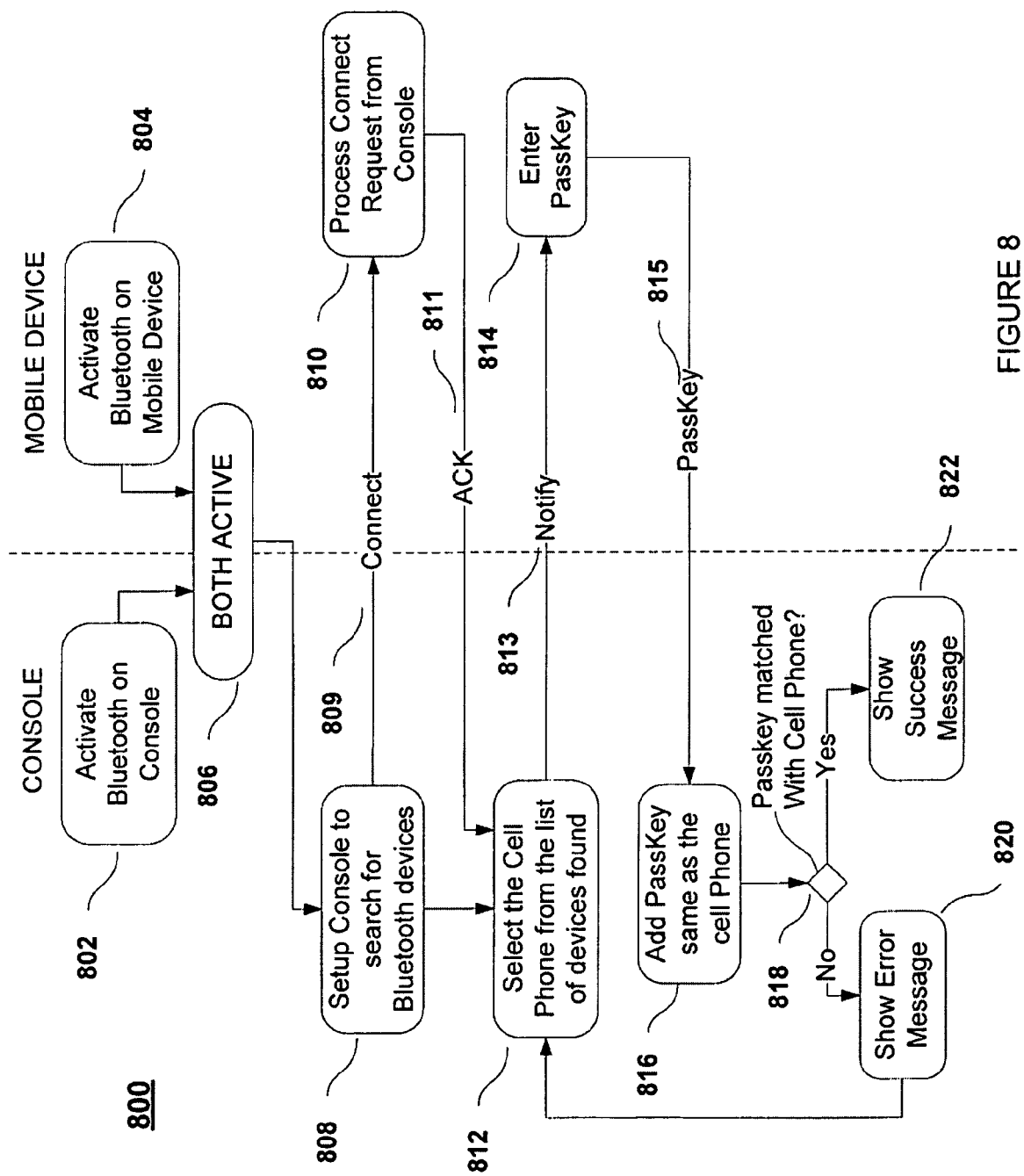
FIG. 8 is a flow chart of a method of establishing a wireless communication link between a mobile device and a game console.

FIG. 8 is a flow chart of a method 800 of establishing a wireless communication link between a mobile device and a game console. The method 800 can be performed, for example, by the game console 102 and the mobile device 108 over a Bluetooth short range wireless network.

The method 800 is illustrated with the game console 105 acting as the master and the mobile station 108 acting as the slave. However, the mobile station 108 could act the part of the master with the game console 105 acting the part of the slave. In addition, the position of master and slave can be switch between the mobile station 108 and the game console 105. At blocks 802 and 804, the game console 102 and the mobile device 108, respectively, individually activate the Bluetooth module. These activations can occur at different times. For example, the game console 102 can have Bluetooth activated continuously while the mobile device may disable (turn off or put into sleep mode) the Bluetooth module for power saving reasons.

When both Bluetooth modules are active, at junction 806, the process 800 continues to block 808 where the game console 102 searches for Bluetooth devices. Upon locating a Bluetooth device a "connect-request" message 809 is sent to the mobile device 108. At block 810, the mobile device processes the connect request message 809. Upon processing the connect request message 809, the mobile device 108 sends an acknowledgement message 811 to the game console 102.

Upon receiving the acknowledgement message 811, the game console 102 selects the mobile device 208 from the list of devices found (assuming that there is more than one Bluetooth device present). After selecting the mobile device 108 at the block 812, the game console 102 transmits a notification message 813 to the mobile device 108.

The example method 800 establishes a secure (encrypted) connection between the mobile device 108 and the game console 102. In some aspects an insecure connection can be used. In these insecure aspects, the remaining blocks 814-822 can be omitted.

Upon receiving the notification message, the user of the mobile device 108 enters a passkey at block 814. The mobile device transmits a message 815 containing the passkey to the game console 102. At block 816, the user enters the same pass key into the game console 102.

At decision block 818, the game console 102 determines if the two passkeys match. If the passkeys match, a success message is displayed on the video display 104 at block 822. If the pass keys do not match, an error message is displayed on the video display 104 and the process 800 returns to block 812 to repeat the security process.

The method 800 can be used in the methods 400, 600 and 700 for detecting the mobile device 108 and/or establishing a wireless connection (see blocks 430, 605, and 740 in FIGS. 4A, 6 and 7, respectively).

The above description of the disclosed embodiments is provided to enable any person skilled in the art to make or use the disclosure. Various modifications to these embodiments will be readily apparent to those skilled in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method of providing a virtual coupon associated with an asset, the method comprising:
    displaying a virtual world on a video display;
    displaying a tagged image within the video display of the virtual world, the tagged image being associated with an asset;
    receiving an input from a input device indicating selection of the tagged image by a user interacting with the virtual world;
    storing in memory one or more of a record of the selected tagged image and a record of the asset associated with the tagged image;
    detecting a mobile device; and
    upon detecting the mobile device, wirelessly communicating information to the mobile device, the communicated information related to one or more of the tagged image and the asset with which the tagged image is associated.

2. The method of claim 1, wherein the asset comprises a product and the communicated information comprises a digital coupon redeemable for a discount on the purchase price of the product.

3. The method of claim 1, wherein the asset comprises one or more of digital music, user generated digital content, a physical product that can be purchased, a digital literary work, and a digital video.

4. The method of claim 1, further comprising receiving data representing the tagged image and the associated asset.

5. The method of claim 1, further comprising:
    analyzing the stored records of one or more past tagged images or assets selected by the user interacting with the virtual world; and
    determining the tagged image to be displayed based on a relationship to the images or assets selected by the user in the past.

6. The method of claim 1, wherein wirelessly communicating comprises wirelessly communicating the information using Bluetooth.

7. The method of claim 1, wherein the tagged image comprises one or more of a barcode, a watermarked image, a hash function and a digital certificate.

8. The method of claim 1, wherein detecting the wireless device comprises using Bluetooth discovery protocol.

9. A system for providing a virtual coupon associated with an asset, the system comprising:
- a video subsystem configured to display a virtual world on a video display, and to display a tagged image within the video display of the virtual world, the tagged image being associated with an asset;
- an input interface configured to receive an input from an input device indicating selection of the tagged image by a user interacting with the virtual world;
- a processor configured to store in memory one or more of a record of the selected tagged image and a record of the asset associated with the tagged image; and
- a wireless interface configured to detect a mobile device using a wireless discovery protocol, and, upon detecting the mobile device, to wirelessly communicate information to the mobile device, the communicated information related to one or more of the tagged image and the asset with which the tagged image is associated.

10. The system of claim 9, wherein the asset comprises a product and the communicated information comprises a digital coupon redeemable for a discount on the purchase price of the product.

11. The system of claim 9, wherein the asset comprises one or more of digital music, user generated digital content, a physical product that can be purchased, a digital literary work, and a digital video.

12. The system of claim 9, further comprising a network interface configured to receive data representing the tagged image and the associated asset.

13. The system of claim 9, further comprising a coupon distribution module configured to analyze the stored records of one or more past tagged images or assets selected by the user interacting with the virtual world, and determine the tagged image to be displayed based on a relationship to the images or assets selected by the user in the past.

14. The system of claim 9, wherein the wireless interface is further configured to wirelessly communicate the information using Bluetooth.

15. The system of claim 9, wherein the tagged image comprises one or more of a barcode, a watermarked image, a hash function and a digital certificate.

16. The system of claim 9, wherein the wireless interface is configured to detect the wireless device using Bluetooth discovery protocol.

17. A method of controlling a virtual world video sequence, the method enabling insertion of user selectable images into the virtual world video sequence, the method comprising:
- generating, by a computer system, video data configured to display the virtual world video sequence;
- receiving tag data associated with a selectable image in the video sequence, the tag data being associated with an asset;
- outputting, from the computer system, the video data, including the selectable image;
- receiving an indicator that the selectable image has been selected by a user; and
- outputting, from the computer system, the tag data upon receiving the indicator.

18. The method of claim 17, further comprising:
- providing an insertion point in the virtual world video data to insert the selectable image;
- receiving image data representing the selectable image; and
- inserting the image data at the insertion point.

19. A computer readable medium encoded with computer executable instructions for performing a method of controlling a virtual world video sequence, the instructions enabling insertion of user selectable images into the virtual world video sequence, the method comprising:
- providing video data configured to display a virtual world video sequence;
- receiving tag data associated with a selectable image in the video sequence, the tag data being associated with an asset;
- outputting, from the computer system, the video data, including the selectable image;
- receiving an indicator that the selectable image has been selected by a user; and
- outputting, from the computer system, the tag data upon receiving the indicator.

20. The computer readable medium of claim 19, further comprising instructions for:
- providing an insertion point in the virtual world video data to insert the selectable image;
- receiving image data representing the selectable image; and
- inserting the image data at the insertion point.

21. A method of receiving a virtual coupon associated with an asset, the method comprising:
- establishing a short range wireless connection with a gaming system, the gaming system being configured to display a virtual world on a video display, and to display a tagged image within the video display of the virtual world, the tagged image being associated with an asset;
- upon establishing the wireless connection with the gaming system, receiving information related to one or more of the tagged image and the asset with which the tagged image is associated;
- storing the received information in memory; and
- transmitting or displaying the stored information.

* * * * *